(12) United States Patent
Hsin

(10) Patent No.: US 6,804,079 B2
(45) Date of Patent: Oct. 12, 2004

(54) WRITTEN-IN REPEATABLE RUN-OUT COMPENSATION IN EMBEDDED SERVO DISC DRIVES

(75) Inventor: Yi-Ping Hsin, Burnsville, MN (US)

(73) Assignee: Seagate Technology LLC, Scotts Valley, CA (US)

(*) Notice: Subject to any disclaimer, the term of this patent is extended or adjusted under 35 U.S.C. 154(b) by 321 days.

(21) Appl. No.: 10/017,930

(22) Filed: Dec. 12, 2001

(65) Prior Publication Data

US 2003/0058569 A1 Mar. 27, 2003

Related U.S. Application Data

(60) Provisional application No. 60/310,397, filed on Aug. 6, 2001.

(51) Int. Cl.[7] .............................................. G11B 5/596
(52) U.S. Cl. .................................................. 360/77.04
(58) Field of Search ........................... 360/77.04, 77.08

(56) References Cited

U.S. PATENT DOCUMENTS

| | | | |
|---|---|---|---|
| 4,135,217 A | 1/1979 | Jacques et al. ................ 360/77 |
| 5,444,583 A | 8/1995 | Ehrlich et al. ........... 360/78.09 |
| 5,550,685 A | 8/1996 | Drouin .................... 360/77.08 |
| 5,825,578 A | 10/1998 | Shrinkle et al. ......... 360/77.08 |
| 5,854,722 A | 12/1998 | Cunningham et al. ... 360/77.04 |
| 5,858,796 A | 1/1999 | Pham et al. ............. 360/77.04 |
| 5,867,340 A | 2/1999 | Morehouse et al. ..... 360/77.04 |
| 5,875,066 A | 2/1999 | Ottesen ................... 360/77.11 |
| 5,886,846 A | 3/1999 | Pham et al. ............. 360/78.04 |
| 5,923,491 A | 7/1999 | Kisaka et al. ............ 360/77.04 |
| 5,926,338 A | 7/1999 | Jeon et al. ............... 360/77.04 |
| 5,949,605 A | 9/1999 | Lee et al. ................ 360/77.04 |
| 5,978,169 A | 11/1999 | Woods .................... 360/77.04 |
| 5,995,317 A | 11/1999 | Ottesen ................... 360/77.04 |
| 6,049,440 A | 4/2000 | Shu ........................ 360/77.04 |
| 6,097,565 A | 8/2000 | Sri-Jayantha et al. .... 360/78.09 |
| 6,141,175 A | 10/2000 | Nazarian et al. ......... 360/77.04 |
| 6,236,536 B1 | 5/2001 | Ma et al. ................. 360/99.08 |
| 2002/0089779 A1 * | 7/2002 | Heydt et al. ............. 360/77.08 |

* cited by examiner

*Primary Examiner*—David Hudspeth
*Assistant Examiner*—Mitchell Slavitt
(74) *Attorney, Agent, or Firm*—Westman, Champlin & Kelly

(57) ABSTRACT

An apparatus and method of correcting for written-in repeatable run-out in a disc drive having a servo loop for positioning a head over a rotating disc is provided. The rotating disc has at least one data track and servo information recorded in a plurality of servo fields along the data track. An initial written-in repeatable run-out compensation value for each servo field is computed as a function of a position error signal generated for each servo field during a first revolution of the disc. The initial written-in repeatable run-out compensation value for each servo field is then injected into the servo loop during another revolution of the disc. A compensated position error signal for each servo field is computed as a function of the initial written-in repeatable run-out compensation value for each servo field. A refined written-in repeatable run-out compensation value for each servo field is then computed as a function of the compensated position error signal for each servo field.

18 Claims, 10 Drawing Sheets

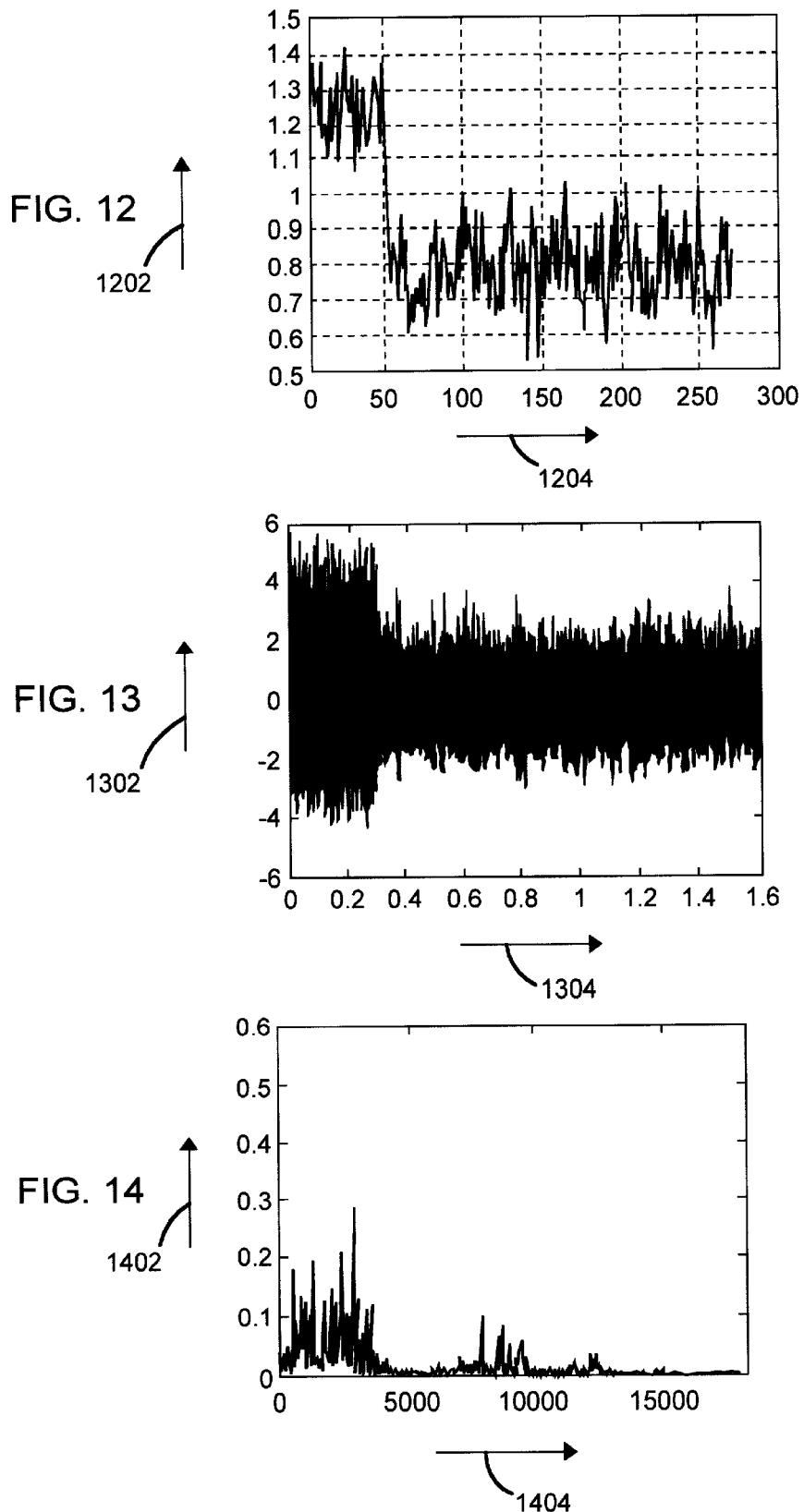

WRITTEN-IN REPEATABLE RUN-OUT COMPENSATION IN EMBEDDED SERVO DISC DRIVES

CROSS-REFERENCE TO RELATED APPLICATION

This application claims priority from U.S. Provisional Application 60/310,397 filed on Aug. 6, 2001 for inventors Yi-Ping Hsin and Steven Michael Gigl and entitled "REPETITIVE CONTROL APPROACH FOR WRITTEN-IN REPEATABLE RUN-OUT COMPENSATION IN EMBEDDED SERVO DISC DRIVES."

FIELD OF THE INVENTION

The present invention relates generally to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo sub-system to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high-frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in a track interfering with or squeezing an adjacent track. This is especially acute when a first written-in error causes a head to be outside of an inner track's ideal circular path and a second written-in error causes the head to be inside of an outer track's ideal circular path. To avoid limitations on the track pitch, systems that compensate for repeatable run-out errors are employed.

One existing technique for repeatable run-out error compensation involves obtaining a sequence of repeatable run-out values, computing compensation values based on the repeatable run-out values, and storing the compensation values in compensation tables. These compensation values are then injected into the servo loop to compensate for repeatable run-out errors. In this technique, the sequence of repeatable run-out errors is obtained by repeatedly following tracks on the discs over a number of revolutions and averaging the position error signals obtained at each servo field over all of the revolutions. This averaging process is time consuming and complex. In addition, the repeatable run-out compensation values cannot be obtained in real-time, during disc operation, by using this technique.

Embodiments of the present invention provide solutions to these and other problems, and offer other advantages over the prior art.

SUMMARY OF THE INVENTION

The present embodiments relate to disc drive servo systems that employ a real-time adaptive repeatable run-out compensation scheme to compensate for written-in repeatable run-out errors in the servo system, thereby addressing the above-mentioned problems.

An apparatus and method of correcting for written-in repeatable run-out in a disc drive having a servo loop for positioning a head over a rotating disc is provided. The rotating disc has at least one data track and servo information recorded in a plurality of servo fields along the data track. An initial written-in repeatable run-out compensation value for each servo field is computed as a function of a position error signal generated for each servo field during a first revolution of the disc. The initial written-in repeatable run-out compensation value for each servo field is then injected into the servo loop during another revolution of the disc. A compensated position error signal for each servo field is computed as a function of the initial written-in repeatable run-out compensation value for each servo field. A refined written-in repeatable run-out compensation value for each servo field is then computed as a function of the compensated position error signal for each servo field.

These and various other features as well as advantages which characterize the present invention will be apparent upon reading of the following detailed description and review of the associated drawings.

BRIEF DESCRIPTION OF THE DRAWINGS

FIG. 12 is a plot of the root mean square of the position error signal at each repetition.

FIG. 13 is a plot showing the transition of position error values while the repetitive controller learns the periodic error components in the servo loop.

FIG. 14 is the frequency spectrum of the position error signal with the repetitive controller turned on.

DETAILED DESCRIPTION OF ILLUSTRATIVE EMBODIMENTS

Figure 1:
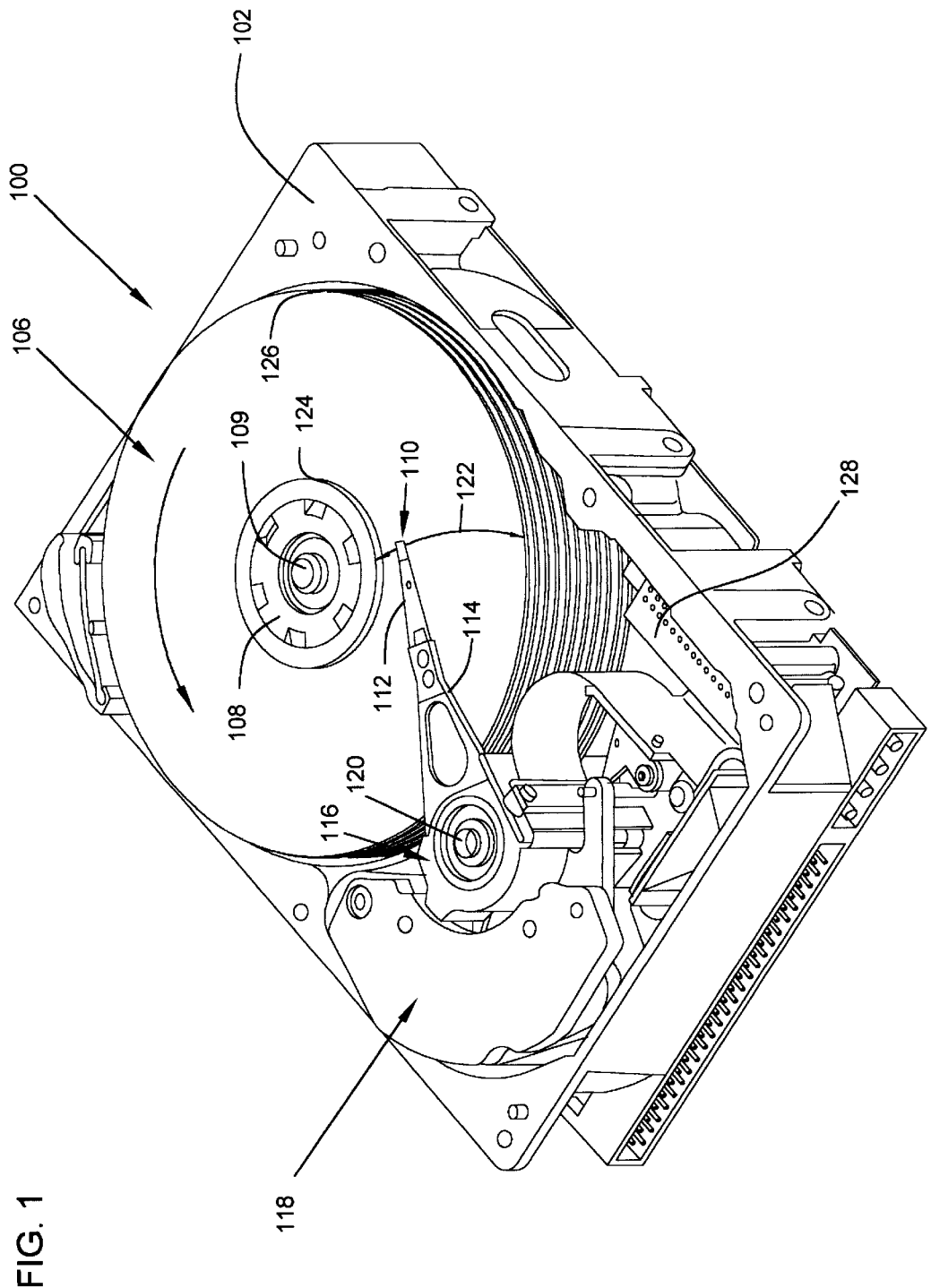
FIG. 1 is a perspective view of a head-disc assembly (HDA) with which the present invention is useful.

Referring now to FIG. 1, a perspective view of a head-disc assembly (HDA) 100 with which the present invention is useful is shown. The same reference numerals are used in various figures to represent same or similar elements. HDA 100 includes a housing with a base 102 and a top cover (not shown). HDA 100 further includes the disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are, in turn, supported by track accessing arms 114 of an actuator 116. The actuator shown in FIG. 1 is of the type known as a rotary moving coil actuator and includes a voice coil motor (VCM), shown generally as 118. Other types of actuators can be used, such as linear actuators.

VCM 118 rotates actuator 116 with its attached sliders 110 about a pivot shaft 120 to position sliders 110 over a desired data track along a path 122 between a disc inner diameter 124 and a disc outer diameter 126. VCM 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position. Once the transducing head is appropriately positioned, servo controller 128 then executes the desired read or write operation.

Figure 2:
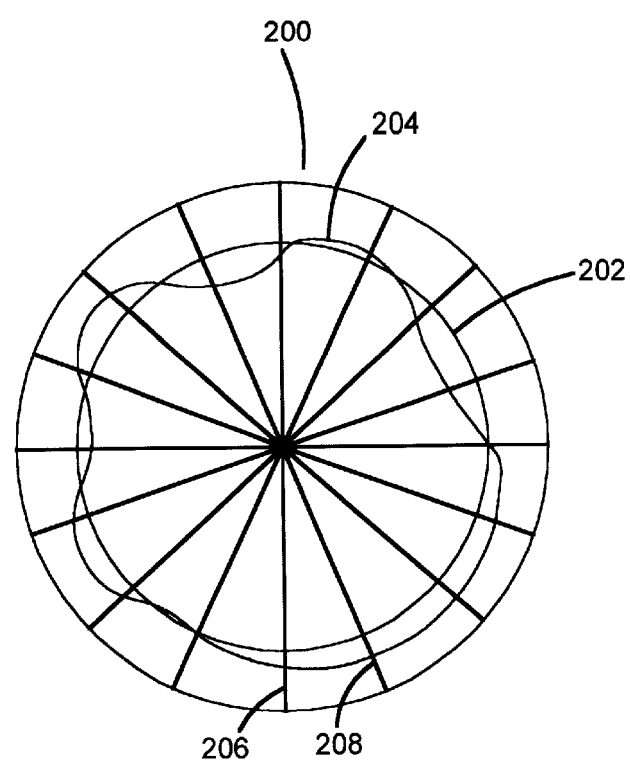
FIG. 2 is a top view of a section of a disc showing an ideal track and a realized written-in track.

Referring now to FIG. 2, a top view of a section 200 of a disc with an ideal, perfectly circular track 202 and an actual track 204 is shown. Section 200 includes a plurality of radially extending servo fields such as servo fields 206 and 208. The servo fields include servo information that identifies the location of actual track 204 along disc section 200. Any variation in the position of a head away from circular track 202 is considered as position error. The portions of track 204 that do not follow circular track 202 create written-in repeatable run-out position errors. A position error is considered a repeatable run-out error if the same error occurs each time the head passes a particular circumferential location on the disc. Track 204 creates a repeatable run-out error because each time a head follows the servo fields that define track 204, it produces the same position error relative to ideal track 202.

Under the present invention, a head attempting to write to or read from track 204 will not follow track 204 but instead, will more closely follow perfectly circular track 202. This is accomplished using a compensation signal that prevents the servo system from tracking repeatable run-out errors resulting from the irregular shape of track 204.

Figure 3:
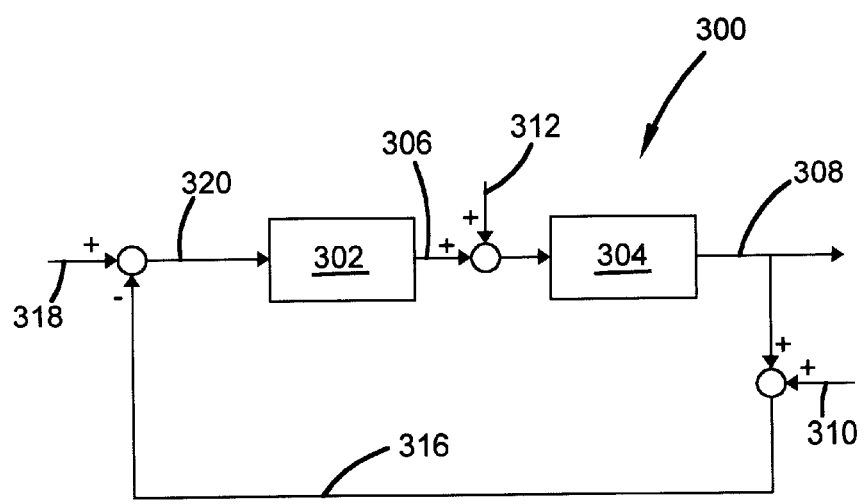
FIG. 3 is a block diagram of a prior art servo loop.

Referring now to FIG. 3, a block diagram of a servo loop 300 of the prior art is shown. The servo loop includes a servo controller 302, having a transfer function K(z) and an actuator 304 having a transfer function P(z). Servo controller 302 is a part of the internal circuitry within internal circuit 128 of FIG. 1. Actuator 304 includes actuator assembly 116, voice coil motor 118, track accessing arm 114, suspension 112, and sliders 110, all of FIG. 1.

Servo controller 302 generates a control signal 306 that drives the actuator 304. In response, actuator 304 produces head motion 308. In FIG. 3, the written-in error, w(k), is represented as a separate input signal 310 even though the written-in error would otherwise appear implicitly in head motion 308. The separation of written-in error 310 from head motion 308 provides a better understanding of the present invention. In addition, noise, d(k), in the servo system has been separated and appears as noise 312, which is added to the control signal. The sum of head motion 308 that includes noise 312, and written-in error 310 results in the head's servo measurement signal, z(k), represented by reference numeral 316. Servo measurement signal 316 is subtracted from a reference signal, r(k), represented by reference numeral 318, which is generated by internal circuitry 128 based on a desired location for the head. Subtracting head measurement 316 from reference signal 318 produces a position error signal (PES), e(k), represented by reference numeral 320, which is input to servo controller 302.

PES 320 includes a repeatable run-out (RRO) error component and a non-repeatable run-out (NRRO) error component. RRO is caused by the rotation of the spindle motor and the written-in run-out at servo patterns. NRRO is caused by spindle ball bearing defects, rocking modes, disc vibration, etc. The statistical 3-σ values (where σ denotes the standard deviation) of the RRO, NRRO and PES measurements are used as disc drive performance indexes and have the following relationship:

$$\sigma_{PES}^2 = \sigma_{RRO}^2 + \sigma_{NRRO}^2 \qquad \text{Equation (1)}$$

A Discrete Fourier Transform (DFT) of the PES shows the RRO components as distinct peaks at harmonics of the disc drive spindle rotational frequency. RRO components from rotation of the spindle motor dominate at the first few harmonics of the spindle frequency, and the remaining peaks up to the Nyquist frequency or sampling frequency (sampling occurs at each servo field) are all contributed from the written-in position error referred to as written-in repeatable run-out (WI-RRO).

Figure 4:
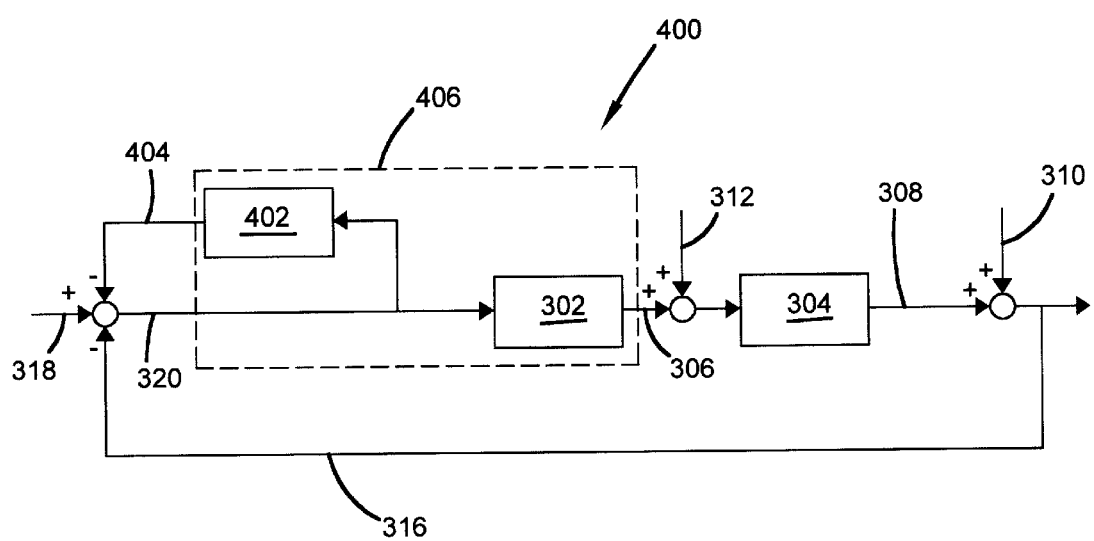
FIG. 4 is a block diagram of a servo loop of an embodiment of the present invention.

To eliminate the unwanted head motion created by WI-RRO, the present invention adds a compensation signal, produced by a repetitive control module, to the servo loop of the prior art. Referring now to FIG. 4, a block diagram of a servo loop 400 of the present invention is shown. In FIG. 4, the elements common to FIG. 3 are numbered the same. The compensation signal added to the servo loop is compensation signal 404, which is produced by repetitive control module 402. Thus, controller 406 of the present invention includes prior art servo controller 302 and repetitive control module 402. In FIG. 4, compensation signal 404 is inserted at the summation of reference signal 318 and servo measurement 316. However, those skilled in the art will recognize that the compensation signal can be added at other locations within the servo loop.

Repetitive control module 402 is designed to identify and learn the repeating WI-RRO sequence and to output compensation signal 404 which is added to servo loop 400 to attenuate the effect of WI-RRO. Since this technique involves learning the periodic WI-RRO disturbance, it usually takes several disc revolutions before compensation signal 404 converges to the WI-RRO profile. Details of the repetitive learning process are described further below. As it is unlikely that the WI-RRO on different tracks will be the same, the WI-RRO is preferably calculated for each track. Once the compensation signal values converge to the WI-RRO profile (i.e., when a set of steady state compensation values are obtained), they can be stored in compensation tables. These stored steady state compensation values can be injected into servo loop 400 for WI-RRO cancellation. The repetitive control module may be excluded from servo loop 400 once a set of steady state compensation values are obtained. Thus, repetitive control module 402 may be either permanently operating in servo loop 400 or may be temporarily included in the loop until a set of steady state WI-RRO compensation values are obtained. The design of repetitive control module 402 is described below in connection with FIGS. 4 and 5.

For simplification, transfer functions K(z) and P(z) will hereinafter be used to represent servo controller 302 and actuator 304, respectively. The sensitivity function or error function of a servo loop is the ability of the servo loop to attenuate disturbance. The closed-loop sensitivity function S(z) of servo loop 300 (FIG. 3) of the prior art can be expressed as:

$$S(z) = \frac{1}{1 + K(z)P(z)} \qquad \text{Equation (2)}$$

Repetitive control module 402 (FIG. 4) is represented by transfer function L(z). PES, e(k), is the input to L(z) and the output of L(z) is compensation signal u(k) which is injected into the servo loop to attenuate the WI-RRO, w(k).

The repetitive control law used for the design of repetitive controller L(z) is as follows:

$$u(k)=q(k)*[u(k-p)+f(k)*e(k-p)] \qquad \text{Equation (3)}$$

where * indicates a convolution sum; p is the disc revolution time period and q(k) and f(k) are filters used in the repetitive control module design. Taking the z-transform of Equation (3) results in the following expression:

$$U(z)=z^{-p}Q(z)[U(z)+F(z)E(z)] \qquad \text{Equation (4)}$$

which can be re-written as:

$$[1-z^{-p}Q(z)]U(z)=z^{-p}Q(z)F(z)E(z) \qquad \text{Equation (5)}$$

Combining terms of Equation (5) yields the repetitive controller transfer function, L(z), which is expressed as:

$$L(z) = \frac{U(z)}{E(z)} = \frac{z^{-p}Q(z)F(z)}{1 - z^{-p}Q(z)} \qquad \text{Equation (6)}$$

Figure 5:
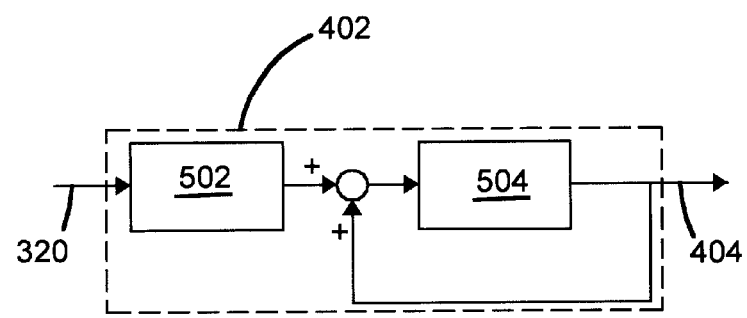
FIG. 5 is a block diagram representing the structure of a repetitive control module.

A block diagram showing details of the repetitive controller L(z) is shown in FIG. 5. The input to the repetitive control module 402 is PES, e(k), represented by reference numeral 320. Block 502 represents a first filter F(z) and block 504 represents $z^{-p}Q(z)$, where Q(z) is a second filter. As can be seen in FIG. 5, the repetitive controller output, u(k), represented by reference numeral 404, is fed back to a summing node between blocks 502 and 504.

From the block diagram in FIG. 4, the sensitivity function expressed by Equation (2), and the transfer function of the repetitive controller represented by Equation (6), it can be derived that $$\{1-z^{-p}Q(z)[1-F(z)S(z)]\}E(z)= \\ [1-z^{-p}Q(z)][R(z)-W(z)-P(z)D(z)]S(z) \qquad \text{Equation (7)}$$

Provided that period p is sufficiently long, the homogeneous equation on the left-hand side of Equation (7) can be re-written as:

$$E(z)=Q(z)[1-F(z)S(z)]z^{-p}E(z) \qquad \text{Equation (8)}$$

Equation (8) can be represented in the repetition domain as:

$$E_j(z)=Q(z)[1-F(z)S(z)]E_{j-1}(z) \qquad \text{Equation (9)}$$

where j represents the repetition number. The condition needed for producing monotonic decay of every steady-state discrete frequency component of the WI-RRO at each repetition is $$|Q(e^{j\omega T})[1-F(e^{j\omega T})S(e^{j\omega T})]|<1 \qquad \text{Equation (10)}$$

Here $Q(e^{j\omega T})$ and $F(e^{j\omega T})$ are the steady-state frequency response for the repetitive control law given by q(k) and f(k) (Equation (3)), and $S(e^{j\omega T})$ is the steady-state frequency response of the sensitivity function of servo loop 300. The term on the left-hand side of Equation (10) also gives the convergence rate of the periodic WI-RRO at each frequency. The right-hand side of Equation (7) represents the forcing function for letting E(z) converge to a particular solution.

Filter F(z) is designed to adjust the magnitude and phase of input error in order to stabilize the learning process. Q(z) is usually designed as a zero-phase FIR filter to control the learning frequency range.

From the right-hand side of Equation (7) it follows that the forcing function of the periodic disturbance W(z) can only be totally cancelled out by choosing Q(z)=1. Also, from Equation (7) it follows that the design of F(z) for the fastest convergence of the periodic error is $$F(z)=S^{-1}(z) \qquad \text{Equation (11)}$$

which is equivalent to the inverse of the system sensitivity function S(z) (Equation (2)). In practice, to reduce the amplification of random noise d(k) at the neighborhood frequencies of spindle harmonics, which is called "water bed effect", the filter F(z) is modified as:

$$F(z)=c \cdot S^{-1}(z) \qquad \text{Equation (12)}$$

where c is a constant gain within the range 0<c<1.

Figure 6:
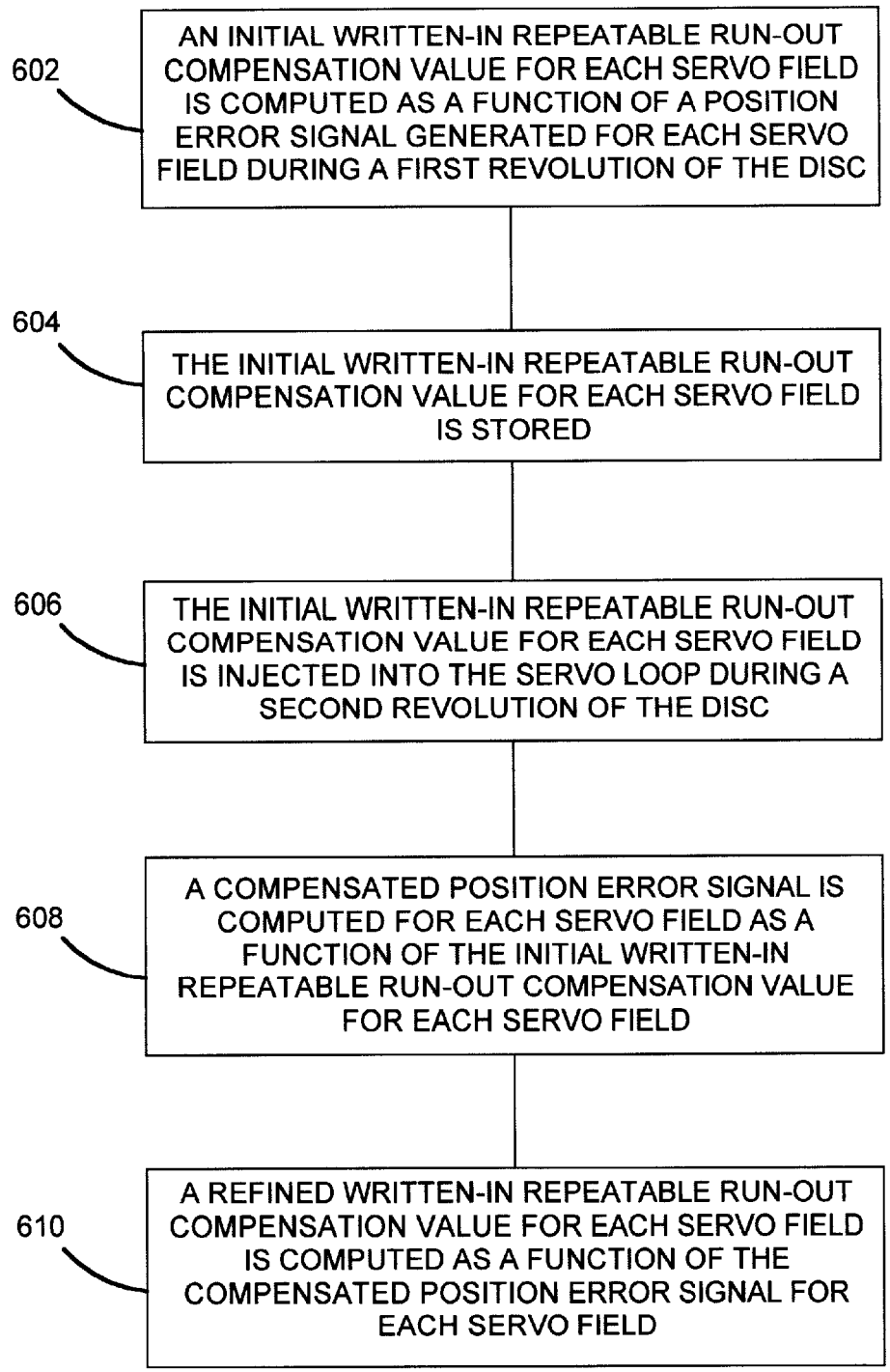
FIG. 6 is a flow chart representing a method of correcting for written-in repeatable run-out in a disc drive in accordance with an embodiment of the present invention.

FIG. 6 is a flow chart representing a method of correcting for written-in repeatable run-out in a disc drive having a servo loop for positioning a head over a rotating disc in accordance with an illustrative embodiment of the present invention. The rotating disc has at least one data track and servo information recorded in a plurality of servo fields along the data track. At step 602, an initial written-in repeatable run-out compensation value for each servo field is computed as a function of a position error signal generated for each servo field during a first revolution of the disc. At step 604, the initial written-in repeatable run-out compensation value for each servo field is stored. At step 606, the initial written-in repeatable run-out compensation value for each servo field is injected into the servo loop during a second revolution of the disc. At step 608, a compensated position error signal for each servo field is computed as a function of the initial written-in repeatable run-out compensation value for each servo field. At step 610, a refined written-in repeatable run-out compensation value for each servo field is then computed as a function of the compensated position error signal and the initial written-in repeatable run-out compensation value (or the refined written-in repeatable run-out compensation value computed during an immediately previous iteration) for each servo field. Preferably, steps 604, 606, 608 and 610 are repeated iteratively until the refined written-in repeatable run-out compensation value for each servo field reaches a steady state written-in repeatable run-out compensation value. A stored steady state written-in repeatable run-out compensation value for each servo field is used to provide compensation during subsequent disc revolutions.

Figure 7:
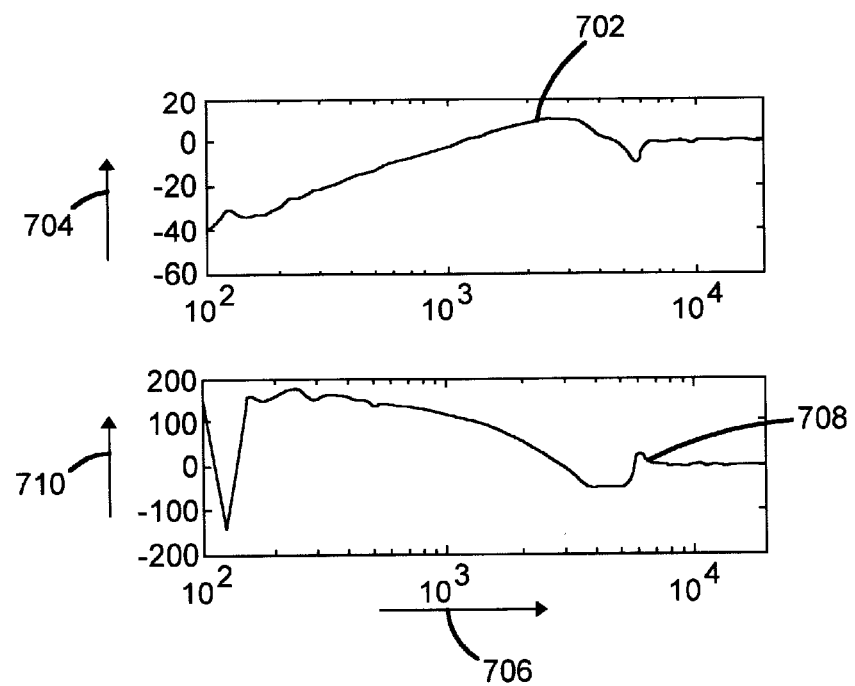
FIG. 7 is a frequency response plot of a sensitivity function of a test disc drive without written-in repeatable run-out compensation.
Figure 8:
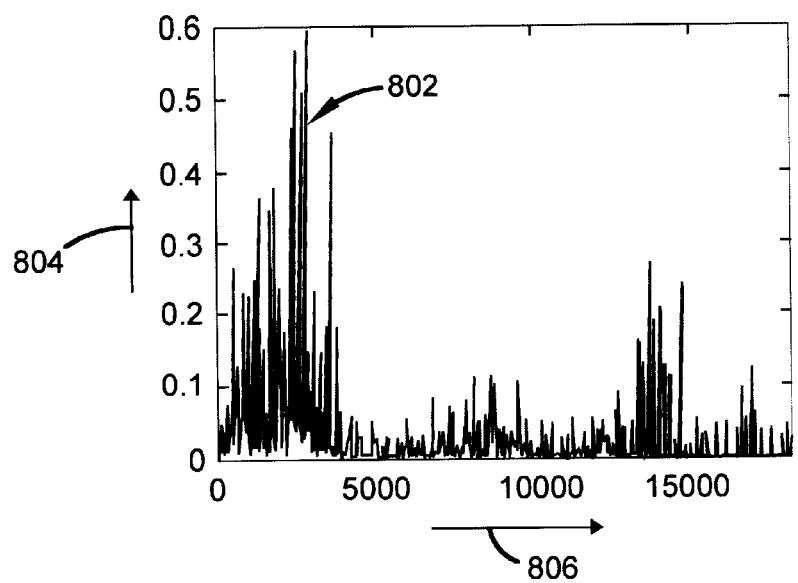
FIG. 8 is a frequency spectrum of position error signal measurements of the test disc drive without written-in repeatable run-out compensation.

The repetitive control scheme for periodic WI-RRO cancellation, described above, was applied to a disc drive having a spindle rotational speed of 10,041 RPM and 224 servo fields. The spindle frequency was 167.35 Hertz (Hz) and the servo sampling frequency was 37,486 Hz (167.35× 224). The sampling time was 26.7 $\mu$sec and the learning time period p was 224 time steps in the repetitive controller design. The frequency response of the closed-loop sensitivity function S(z), defined by Equation (2), was obtained before the inclusion of the repetitive control module. FIG. 7 shows the frequency response of S(z). Plot 702 is a trace of the magnitude of S(z) in decibels (dB) along vertical axis 704 as a function of frequency in Hz along horizontal axis 706. Plot 708 is a trace of phase in degrees (deg) along vertical axis 710 as a function of frequency in Hz along horizontal axis 706. The frequency spectrum of the PES measurements from the disc drive, without the inclusion of the repetitive controller, is shown in FIG. 8. Plot 802 is a trace of the amplitude of the PES in micro inches ($\mu$-in) along vertical axis 804 as a function of frequency in Hz along horizontal axis 806. The distinct peaks located at the multiples of fundamental spindle frequency 167.35 Hz clearly shows the effect of WI-RRO on the PES.

The purpose of the repetitive controller is to compensate for the WI-RRO as accurately as possible in a finite number of revolutions. The learning law of Equation (6) was used to design the repetitive controller. Filter F(z) was designed in accordance with Equation (12) and the constant gain was set to c=0.2. The parametric transfer function of the sensitivity function inverse $S^{-1}(z)$ required in this design was approximated by a frequency domain curve-fitting scheme applied to the reciprocal of the frequency response of S(z). A $6^{th}$ order IIR filter was used for curve-fitting and the resulting transfer function $\bar{S}^{-1}(z)$ obtained was $$\bar{S}^{-1}(z) = \frac{0.99z^6 - 3.77z^5 + 6.49z^4 - 6.47z^3 + 3.89z^2 - 1.28z + 0.16}{z^6 - 3.78z^5 + 6.52z^4 - 6.61z^3 + 4.06z^2 - 1.45z + 0.26}$$

Equation (13)

Figure 9:
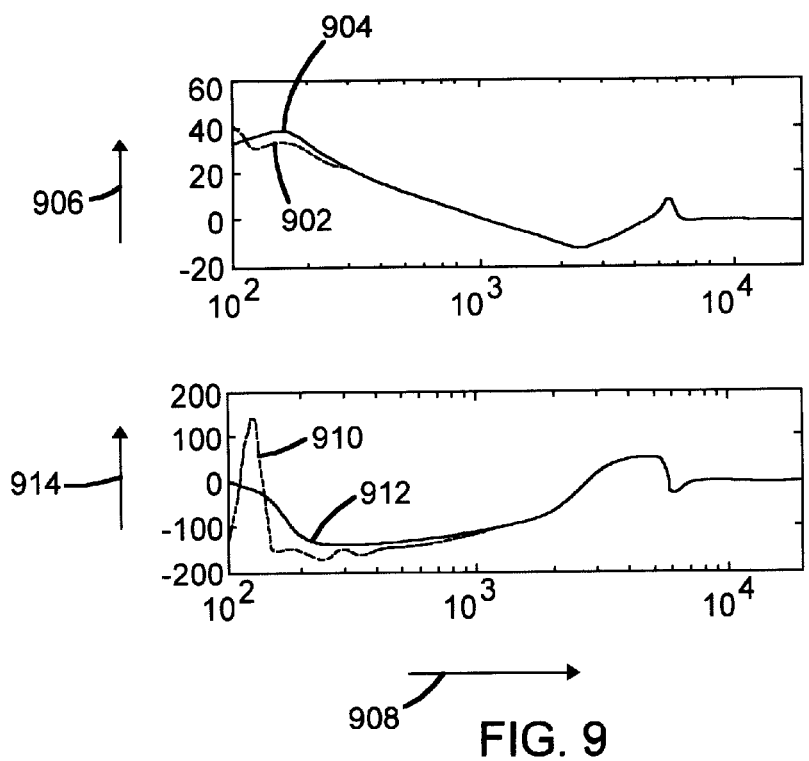
FIG. 9 is a frequency response plot of the inverse sensitivity function and curve-fitting results of the test disc drive.

The frequency response of $S^{-1}(z)$ and curve-fitting results are shown in FIG. 9. Plots 902 and 904 are each traces of the magnitude of $S^{-1}(z)$ and $\bar{S}^{-1}(z)$ in dB along vertical axis 906 as a function of frequency in Hz along horizontal axis 908. Plots 910 and 912 are each traces of the phase of $S^{-1}(z)$ and $\bar{S}^{-1}(z)$ in deg, respectively, along vertical axis 914 as a function of frequency in Hz along horizontal axis 908. The final design of F(z) selected was $$F(z)=0.2\times \bar{S}^{-1}(z)$$

Equation (14)

Figure 10:
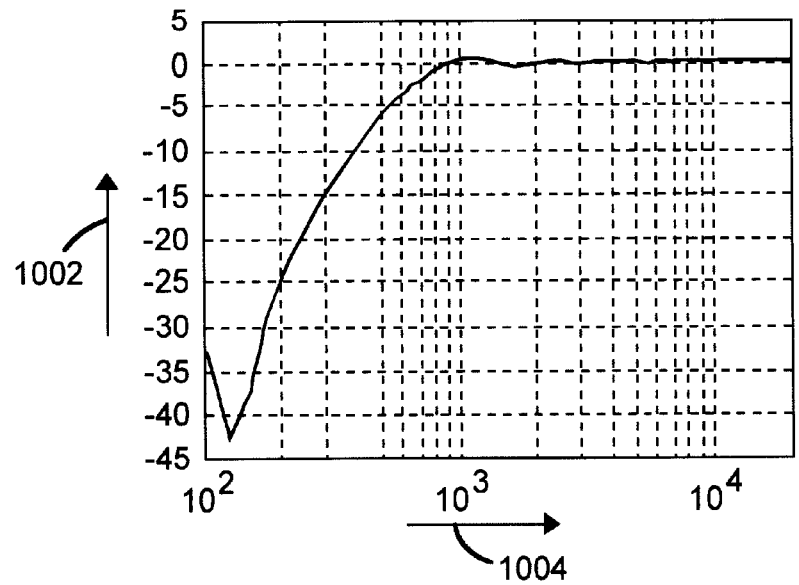
FIG. 10 is a frequency magnitude response plot of an FIR filter employed in the test disc drive.
Figure 11:
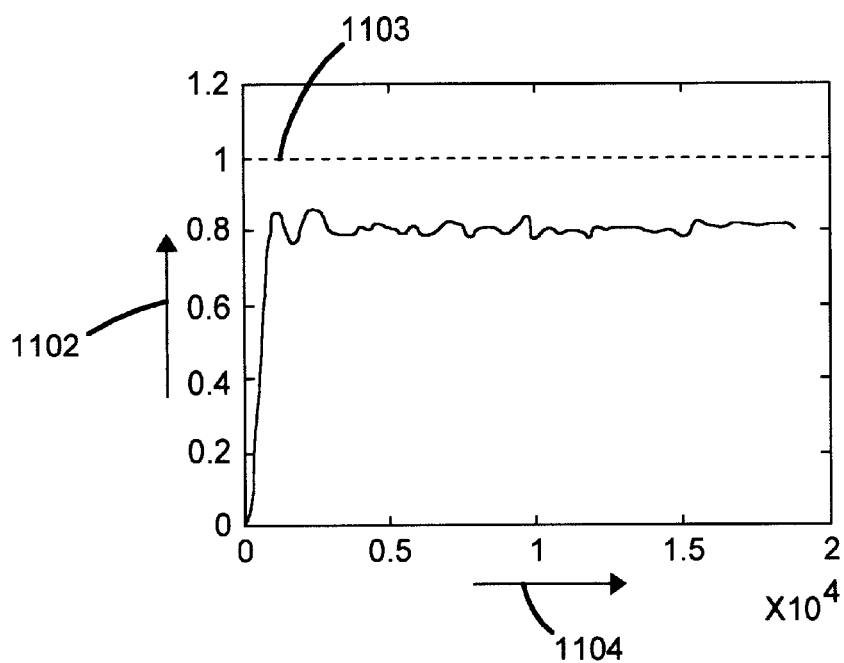
FIG. 11 is a frequency domain stability criterion plot for a repetitive controller design for the test disc drive.

Even through the phase of fitted transfer function $\bar{S}^{-1}(z)$ deviates from the actual system $S^{-1}(z)$ at a low frequency region as shown in FIG. 9, the learning process can still be stabilized if a second filter Q(z) is introduced to satisfy the stability criterion in Equation (10). The second filter Q(z) in this application was designed as a $60^{th}$ order high-pass FIR filter with cut-off frequency at 600 Hz. FIG. 10 shows a frequency magnitude response of Q(z) with magnitude in dB plotted along vertical axis 1002 as a function of frequency in Hz along horizontal axis 1004. FIG. 11 is the frequency domain stability criterion plot of $|Q(e^{j\omega T})[1-F(e^{j\omega T})S(e^{j\omega T})]|$ along vertical axis 1102 as a function of frequency along horizontal axis 1104. As can be seen in FIG. 11, the magnitudes of $|Q(e^{j\omega T})[1-F(e^{j\omega T})S(e^{j\omega T})]|$ are far lower than 1 for the entire frequency region without a chance to cross the stability boundary 1103, thereby satisfying the stability criterion in Equation (10). Another purpose of Q(z) is to avoid learning the peaks at the $1^{st}$, $2^{nd}$, and $3^{rd}$ harmonics caused by the spindle motor but not the WI-RRO.

FIG. 12 is a plot of the root mean square (RMS) of the PES at every repetition. The RMS in $\mu$-in is plotted along vertical axis 1202 as a function of repetition number along horizontal axis 1204. The repetitive controller was turned on at repetition 50. The plot shows the monotonic decay of the PES during the learning process in 20 repetitions and the maintenance of the same error level thereafter. FIG. 13 is a plot of the transition of the PES during the learning process. PES in $\mu$-in is plotted along vertical axis 1302 as a function of time in seconds (sec) along horizontal axis 1304. The plot shows that the PES was sharply reduced after repetition 50 (about 0.3 sec). FIG. 14 is the frequency spectrum of the PES after the convergence of the learning process. PES in $\mu$-in is plotted along vertical axis 1402 as a function of frequency in Hz along horizontal axis 1404. Compared to plot 802 (FIG. 8), most of the RRO peaks have been significantly attenuated.

For calculating the statistical 3-$\sigma$ values from the PES, the PES measurements for 100 revolutions were taken before and after the activation of the repetitive controller. Table 1 shows a comparison of the 3-$\sigma$ values of RRO, NRRO and PES for a specific track.

TABLE 1

| 3-$\sigma$ of | RRO | NRRO | PES ($\mu$-inch) |
|---|---|---|---|
| Before Learning | 3.13 | 2.10 | 3.77 |
| After Learning | 0.63 | 2.18 | 2.67 |

By employing the repetitive controller, a 30% reduction in PES was obtained due to an 80% reduction of RRO. The introduction of the repetitive controller resulted in a slight increase in NRRO.

In summary, a method of correcting for written-in repeatable run-out in a disc drive (such as 100) having a servo loop (such as 400) for positioning a head (such as 110) over a rotating disc (such as 200) is provided. The rotating disc (such as 200) has at least one data track (such as 204) and servo information recorded in a plurality of servo fields (such as 206, 208) along the data track. An initial written-in repeatable run-out compensation value (such as 404) for each servo field (such as 206, 208) is computed as a function of a position error signal (such as 320) generated for each servo field (such as 206, 208) during a first revolution of the disc (such as 200). The initial written-in repeatable run-out compensation value for each servo field injected into the servo loop (such as 400) during another revolution of the disc (such as 200). A compensated position error signal for each servo field is computed as a function of the initial written-in repeatable run-out compensation value for each servo field (such as 206, 208). A refined written-in repeatable run-out compensation value for each servo field is then computed as a function of the compensated position error signal for each servo field (such as 206, 208).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, without departing from the scope and spirit of the present invention. Further, the written-in repeatable run-out compensation scheme may be implemented in hardware or software. The disc drive can be based upon magnetic, optical, or other storage technologies and may or may not employ a flying slider.

What is claimed is:

1. A disc drive for storing information on a rotating disc having at least one data track and servo information recorded in a plurality of servo fields along th at least one data track, the disc drive comprising:

a servo loop for positioning a head over the disc, the servo loop including a servo control module a d a voice coil motor actuator, the voice coil motor actuator is configured to move the head in response to a servo control signal generated by the servo control module; and compensation means coupled to the servo loop for compensating for written-in repeatable run-out.

2. The apparatus of claim 1 wherein:

the servo loop further comprises:

a sensor, located in the head, which is configured to sense servo information located on the disc and produce a servo signal therefrom, th servo signal is combined with a reference signal to produce a position error signal; and the compensation means comprises a repetitive control module adapted to compensate for written-in repeatable run-out in the servo loop by:

computing an initial written-in repeatable run-out compensation value for each servo field of the plurality of servo fields as a function of the position error signal generated for each servo field during a first revolution of the disc;

injecting the initial written-in repeatable run-out compensation value for ea h servo field of the plurality of servo fields into the servo loop during another revolution of the disc;

computing a compensated position error signal for each servo field of the plurality of servo fields as a function of the initial written-in repeatable run-out compensation value for each servo field; and computing a refined written-in repeatable run-out compensation value for each servo field of the plurality of servo fields as a function of the compensated position error signal for each servo field, wherein the servo control module receives the compensated position error signal and responsively produces the servo control signal.

3. The apparatus of claim 2 wherein he repetitive control module includes an infinite impulse response filter that adjusts a magnitude and phase of the position error signal generated for each servo field.

4. The apparatus of claim 2 wherein he repetitive control module includes a finite impulse response filter to limit the range of frequencies over which the repetitive control module operates.

5. The apparatus of claim 2 wherein the repetitive control module includes a time delay line adapted to inject the initial written-in repeatable run-out compensation value for each servo field computed during the first disc revolution into the servo loop during another disc revolution.

6. A method of correcting for written-in repeatable run-out in a system having a servo loop, the method corn rising:

(a) injecting initial written-in repeatable run-out compensation values into the servo loop to obtain compensated position error signal values; and (b) utilizing the compensated position error signal values to obtain refined written-in repeatable run-out compensation values.

7. The method of claim 6 further comprising repeating steps (a) and (b) iteratively, with each iteration utilizing, for injection into the servo loop, refined written-in repeatable run-out compensation values obtained during an immediately previous iteration.

8. The method of claim 7 wherein steps (a) and (b) are repeated iteratively until the refined written-in repeatable run-out compensation values reach steady state written in repeatable run-out compensation values.

9. The method of claim 8 wherein the steady state written-in repeatable run-out compensation values re stored for providing written-in repeatable run out compensation during subsequent operation of the system.

10. The method of claim 9 wherein the system having the servo loop is a disc drive, and wherein the steady state written-in repeatable run-out compensation values are store on a surface of a disc of the disc drive.

11. The method of claim 6 wherein the computing steps (a) and (b) are carried out by a repetitive control module.

12. The method of claim 11 wherein the repetitive control module includes an infinite impulse response filter that adjusts magnitude and phase values of position error signal generated in the servo loop.

13. The method of claim 11 wherein the repetitive control module includes a finite impulse response filter to limit the range of frequencies over which the repetitive control module operates.

14. The method of claim 11 wherein the repetitive control module includes a time delay line for injecting the initial written-in repeatable run-out compensation values into the servo loop.

15. An apparatus having a servo loop, the apparatus comprising:

a repetitive control module adapted to compensate for written-in repeatable run-out in the servo loop by:

injecting initial written-in repeatable run-out compensation values into the servo loop to obtain compensated position error signal values; and utilizing the compensated position error signal values to obtain refined written-in repeatable run-out compensation values.

16. The apparatus of claim 15 wherein t e repetitive control module includes an infinite impulse response filter that adjusts magnitude and phase values of position error signals generated in the servo loop.

17. The apparatus of claim 15 wherein t e repetitive control module includes a finite impulse response filter to limit the range of frequencies over which the repetitive control module operates.

18. The apparatus of claim 15 wherein the repetitive control module includes a time delay line for injecting the initial written-in repeatable run-out compensation values into the servo loop.

* * * * *